(12) United States Patent
Bhatia et al.

(10) Patent No.: US 8,762,696 B2
(45) Date of Patent: Jun. 24, 2014

(54) FIRMWARE WITH A PLURALITY OF EMULATED INSTANCES OF PLATFORM-SPECIFIC MANAGEMENT FIRMWARE

(75) Inventors: Anurag Bhatia, Lilburn, GA (US); Samvinesh Christopher, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 297 days.

(21) Appl. No.: 13/220,047

(22) Filed: Aug. 29, 2011

(65) Prior Publication Data

US 2013/0054943 A1   Feb. 28, 2013

(51) Int. Cl.
*G06F 9/00*   (2006.01)
*G06F 1/32*   (2006.01)

(52) U.S. Cl.
CPC .................................. *G06F 1/3206* (2013.01)
USPC ............................................................ 713/1

(58) Field of Classification Search
CPC .................................................. G06F 1/3206
USPC ............................................................ 713/1
See application file for complete search history.

(56) References Cited

U.S. PATENT DOCUMENTS

| 2004/0228063 A1* | 11/2004 | Hawkins et al. | 361/115 |
| 2008/0126597 A1* | 5/2008 | Hirai | 710/19 |
| 2011/0119424 A1* | 5/2011 | Chen et al. | 710/305 |
| 2012/0137158 A1* | 5/2012 | Nelluri et al. | 713/340 |

* cited by examiner

*Primary Examiner* — Kim Huynh
*Assistant Examiner* — Alyaa T Mazyad
(74) *Attorney, Agent, or Firm* — Morris Manning & Martin, LLP; Tim Tingkang Xia, Esq.

(57) ABSTRACT

In one aspect, a firmware on a management controller operatively connected to a plurality of managed computing platforms is disclosed. In one embodiment, the firmware includes a plurality of emulated instances of platform management firmware. Each emulated firmware instance contains platform-specific configuration data for a corresponding one of the managed computing platforms. The management controller is operative to perform one or more platform management functions for each of the managed computing platforms based at least in part on the configuration data for a corresponding one of the emulated firmware instances.

26 Claims, 4 Drawing Sheets

FIRMWARE WITH A PLURALITY OF EMULATED INSTANCES OF PLATFORM-SPECIFIC MANAGEMENT FIRMWARE

FIELD OF THE INVENTION

The present invention generally relates to firmware for management control of computing platforms, and more particularly to a single firmware having a plurality of emulated instances of platform-specific management firmware.

BACKGROUND OF THE INVENTION

Conventionally, multiple pieces of management hardware are required to manage computing functions of multiple computing platforms, where each management hardware device has a single instance of management firmware for a respective one of the computing platforms. There is an associated cost for each computing platform to be managed in a plurality of computing platforms, such as server platforms, because each managed computing platform requires a separate management hardware device. Accordingly, introducing an additional computing platform to be managed means incurring additional cost for the management hardware. Among other needs, there exists a need for management firmware on a single management hardware device to manage functions of multiple computing platforms.

Therefore, heretofore unaddressed needs still exist in the art to address the aforementioned deficiencies and inadequacies.

SUMMARY OF THE INVENTION

In one aspect, the present invention relates to a firmware on a management controller that is operatively connected to a plurality of managed computing platforms. In one embodiment, the firmware includes a plurality of emulated instances of platform management firmware. Each emulated firmware instance contains platform-specific configuration data for a corresponding one of the managed computing platforms. The management controller is operative to perform one or more platform management functions for each of the managed computing platforms based at least in part on the configuration data for a corresponding one of the emulated firmware instances.

In one embodiment, the platform-specific configuration data includes one or more of IPMI configuration data, SDR repository data, system event log (SEL) data, FRU data, and porting logic data for the corresponding one of the managed computing platforms.

In one embodiment, the platform-specific data includes control parameters for managing operation of one or more hardware components on the corresponding one of the managed computing platforms.

In one embodiment, one or more of the emulated firmware instances is formed as a flash image stored on a memory device of the management controller.

In one embodiment, the management controller is operative to perform the one or more platform management functions for each of the managed computing platforms via a corresponding one of a plurality of communications interfaces. Each communications interface is communicatively coupled to a corresponding one of the managed computing platforms over a corresponding one of a plurality of communications links.

In one embodiment, the one or more platform management functions include monitoring the operation of one or more hardware components on each corresponding one of the managed computing platforms. In this embodiment, the monitoring function includes causing one or more sensors on the corresponding one of the managed computing platforms to detect one or more of the temperature of one or more hardware components, the rotational speed of a spindle motor or CPU fan, the voltage across or applied to one or more hardware components, and the available or used capacity of one or more memory devices.

In another aspect, the present invention relates to a firmware on a management controller that is operatively connected to a plurality of managed computing platforms. In one embodiment, the firmware includes a plurality of emulated instances of platform management firmware. Each emulated firmware instance contains platform-specific configuration data for a corresponding one of the managed computing platforms. Each emulated firmware instance further includes computer-executable instructions which, when executed by a processor of the management controller, cause the management controller to perform one or more platform management functions for each of the managed computing platforms based at least in part on the configuration data for a corresponding one of the emulated firmware instances.

In one embodiment, the platform-specific configuration data includes one or more of IPMI configuration data, SDR repository data, system event log (SEL) data, FRU data, and porting logic data for each corresponding one of the managed computing platforms.

In one embodiment, the platform-specific data includes control parameters for managing operation of one or more hardware components on each corresponding one of the managed computing platforms.

In one embodiment, the plurality of emulated firmware instances is formed in a single flash image stored on a memory device of the management controller.

In one embodiment, the one or more platform management functions for each of the managed computing platforms are performed via a corresponding one of a plurality of communications interfaces. Each communications interface is communicatively coupled to a corresponding one of the managed computing platforms over a corresponding one of a plurality of communications links.

In one embodiment, the one or more platform management functions include monitoring one or more health-related aspects of the operation of one or more hardware components on each corresponding one of the managed computing platforms. In this embodiment, monitoring the one or more health-related aspects includes causing one or more sensors to detect one or more of the temperature of one or more hardware components, the rotational speed of a spindle motor or CPU fan, the voltage across or applied to one or more hardware components, and the available or used capacity of one or more memory devices.

In yet another aspect, the present invention relates to a management controller for managing a plurality of computing platforms. In one embodiment, the management controller includes a plurality of communications interfaces that are each configured to communicatively connect to a corresponding one of the plurality of managed computing platforms. The management controller further includes a memory device including a firmware that contains a plurality of emulated instances of platform management firmware. Each emulated firmware instance contains platform-specific configuration data for a corresponding one of the managed computing platforms. The management controller also includes a processor that is operatively coupled to the memory device and to the plurality of communications interfaces. The processor is programmed to perform one or more platform management functions for each of the managed computing platforms via a corresponding one of the communications interfaces, based at least in part on the platform-specific configuration data of a corresponding one of the emulated firmware instances.

In one embodiment, the platform-specific configuration data includes one or more of IPMI configuration data, SDR repository data, system event log (SEL) data, FRU data, and porting logic data for the corresponding one of the managed computing platforms.

In one embodiment, the platform-specific data includes control parameters for managing operation of one or more hardware components on the corresponding one of the managed computing platforms.

In one embodiment, one or more of the emulated firmware instances are formed in a flash image on the memory device.

In one embodiment, each one of the plurality of communications interfaces is connected to a corresponding one of a plurality of communications links and configured to communicatively connect to a corresponding one of the plurality of managed computing platforms over the corresponding communications link. In this embodiment, one or more of the communications interfaces are configured for communication over SGPIO, I2C, SPI, USB, or SMBus.

In one embodiment, the communications interfaces and corresponding communications links are configured for one or more of LAN, SOL, KCS, and IPMB communications.

In one embodiment, the communications link for one or more of the plurality of communications processor includes an internet connection.

In one embodiment, the one or more platform management functions include causing one or more sensors on each of the plurality of managed computing platforms to detect or more health-related aspects of the operation of one or more hardware components on each corresponding one of the managed computing platforms.

In one embodiment, the one or more health-related aspects include one or more of the rotational speed of a spindle motor or CPU fan, the voltage across or applied to one or more hardware components, and the available or used capacity of one or more memory devices.

In a further aspect, the present invention relates to a method for managing functions of a plurality of computing platforms. In one embodiment, the method comprises the steps of:

installing a firmware on a management controller operatively connected to a plurality of managed computing platforms, wherein the firmware has a plurality of emulated instances of platform management firmware, each emulated firmware instance containing platform-specific configuration for a corresponding one of the managed computing platforms; and performing at least one platform management function for each of the managed computing platforms based at least in part on the configuration data for a corresponding one of the emulated firmware instances.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-4.

Figure 1:
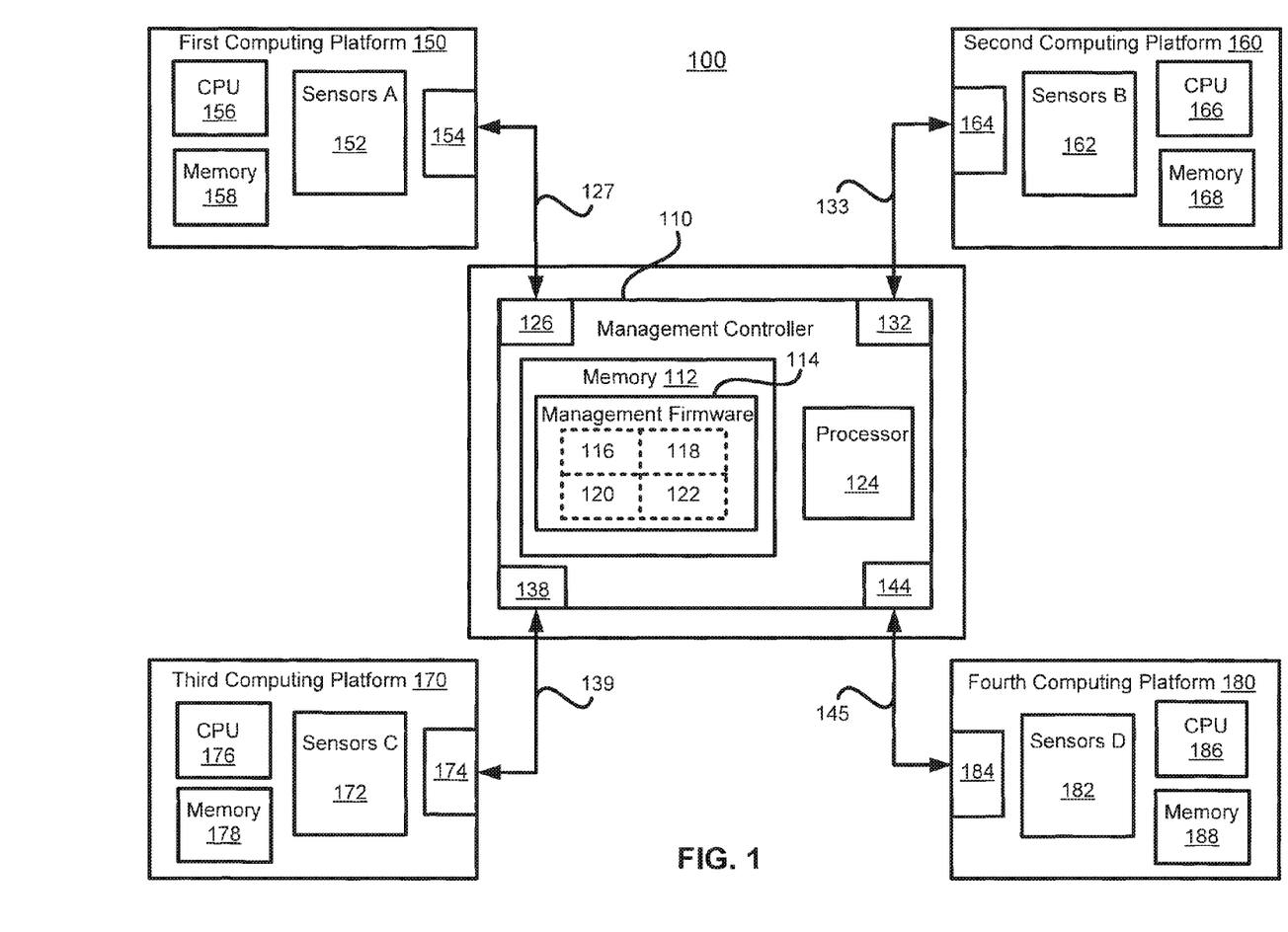
FIG. 1 schematically shows a computer system with a management controller device having a firmware that includes a plurality of emulated instances of platform-specific management firmware for managing a plurality of computing platforms, according to one embodiment of the present invention.
Figure 2:
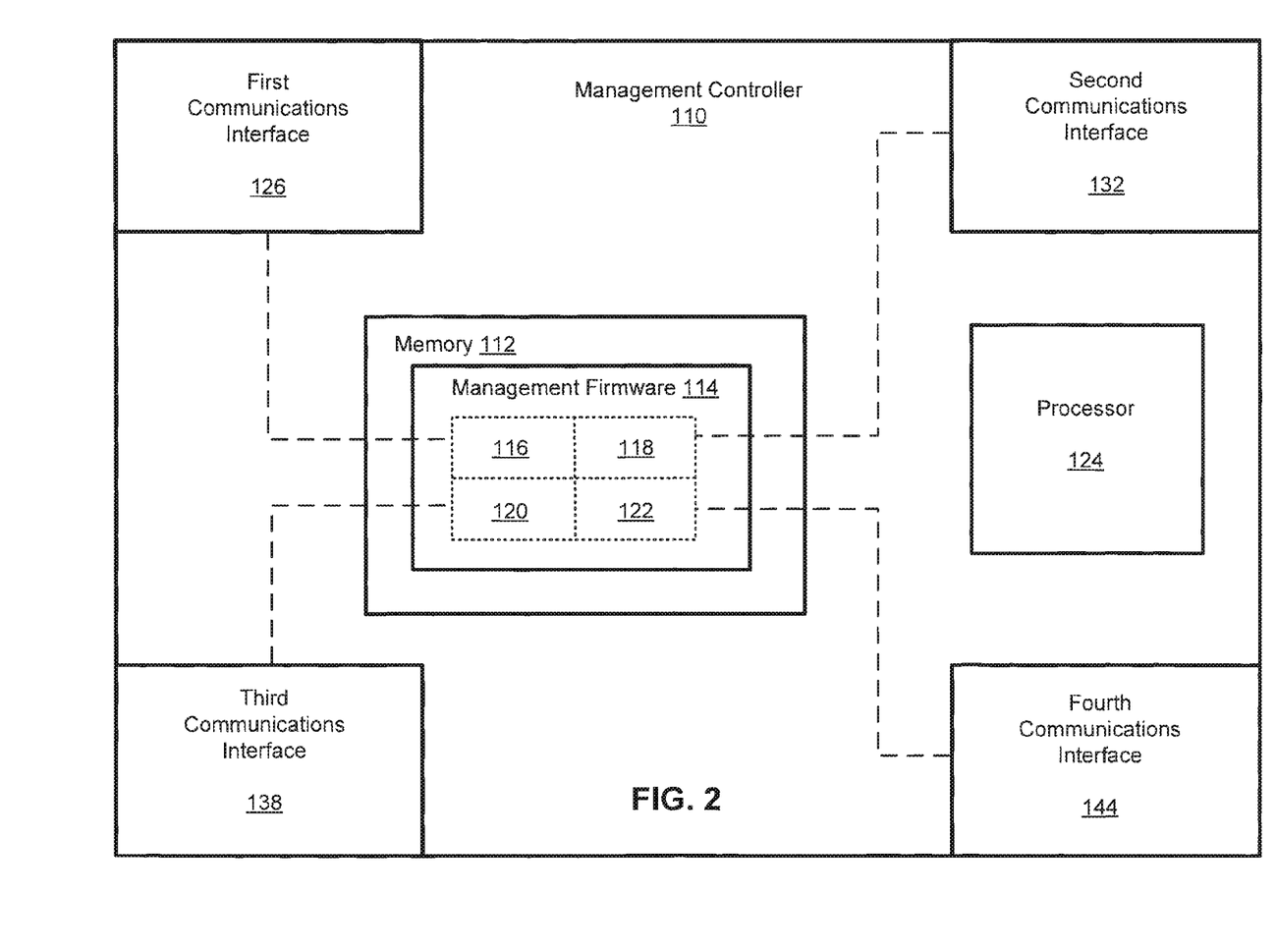
FIG. 2 schematically shows the management controller device according to the embodiment of FIG. 1.

Now specifically referring to FIGS. 1 and 2, a computer system 100 with a management controller 110 is shown. The management controller 110 includes a processor 124, memory device 112, and first, second, third, and fourth communications interfaces 126, 132, 138, 144, respectively. The memory device 112 has stored management firmware 114 that includes a plurality of emulated instances of platform-specific management firmware 116, 118, 120, 122 for managing a plurality of corresponding computing platforms, for example server platforms in a rack of operatively connected server computers that are managed by a management controller that is configured to function as a baseboard management controller (BMC). As shown in FIG. 1, a first computing platform 150 is communicatively coupled by a communications interface 154 to the communications interface 126 of the management controller 110, via a communications link 127. One or more of the communications interfaces 126, 132, 138, 144 and corresponding communications links 127, 133, 139, 145 are configured for LAN, SOL, KCS, and/or IPMB communications. In one embodiment, the communications link corresponding to one or more of the communications interfaces 127, 133, 139, 145 includes an internet connection.

As shown in FIGS. 1 and 2, within the management firmware 114, an emulated instance of platform-specific firmware 116 corresponds to the first computing platform 150 and contains configuration data and/or control parameters for managing functions on the first computing platform 150 via the corresponding communications interface 126. A second computing platform 160 is communicatively coupled by the communications interface 164 to a communications interface 132 of the management controller 110 via a communications link 133. An emulated instance of platform-specific firmware 118, within the management firmware 114, corresponds to the second computing platform 160 and contains configuration and/or control parameters for managing functions on the second computing platform 160 via the communications interface 132. A third computing platform 170 is communicatively coupled by a communications interface 174 to a communications interface 138 of the management controller, via a communications link 139. An emulated instance of platform-specific firmware 120, within the management firmware 114, corresponds to the third computing platform 170 and contains configuration data and/or control parameters for managing functions on the third computing platform 170 via the communications interface 138. A fourth computing platform 180 is communicatively coupled by the communications interface 184 to the communications interface 144 of the management controller 110, via a communications link 145. An emulated instance of platform-specific firmware 122, within the management firmware 114, corresponds to the fourth computing platform 180 and contains configuration data and/or control parameters for managing functions on the fourth computing platform 180 via the communications interface 144.

Figure 3:
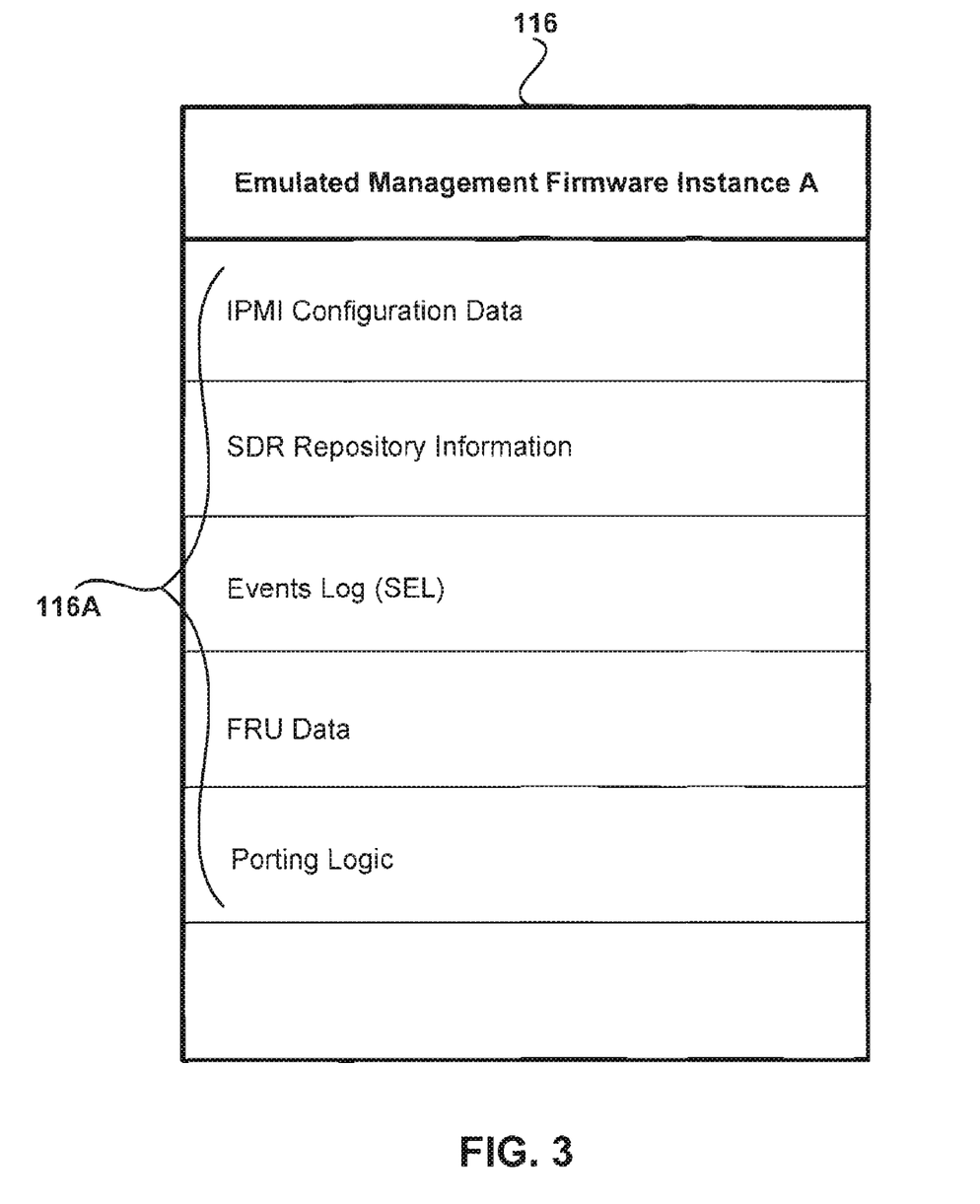
FIG. 3 schematically shows one of the plurality of emulated firmware instances according to the embodiment of FIG. 1.

Now also referring to FIG. 3, each emulated instance of platform-specific firmware 116, 118, 120, 122 contains stored configuration data and/or control parameters to be used by the management controller 110 for performing management functions. In one or more embodiments, a particular emulated firmware instance contains computer-executable instructions which, when executed by the processor 124 of the management controller 110, cause the management controller 110 to perform the management functions for the computing platforms 150, 160, 170, 180 based at least in part on the configuration data and/or control parameters of corresponding emulated firmware instances 116, 118, 120, 122. In FIG. 3, the emulated firmware instance 116 corresponds to the first computing platform 150 shown in FIG. 1, which contains platform-specific configuration data and hardware control parameters 116A. The configuration data and control parameters 116A include IPMI configuration, SDR repository data, system events log (SEL) data, FRU data, and porting logic data for the corresponding computing platform 150. The other emulated firmware instances 118, 120, 122 (not shown in FIG. 3) contain platform-specific configuration data and/or hardware control parameters corresponding to the second computing platform 160, third computing platform 170, and fourth computing platform 180, respectively. It should be appreciated that the emulated firmware instances may alternatively have more or fewer and/or different types of configuration data and control parameters than as shown in the exemplary embodiment of FIG. 3, and also that the configuration data and control parameters 116A correspond to only one exemplary embodiment of an emulated firmware instance and that, alternatively, more or less and/or different types of data and/or parameters may be contained in an emulated instance.

Also, although four computing platforms are shown in the exemplary embodiment of FIG. 1, it should be appreciated that alternatively, more or less than four computing platforms may be managed based on corresponding emulated instances of platform-specific firmware contained within the management firmware 114. It should be appreciated that the spatial arrangement of the emulated firmware instances 116, 118, 120, 122 as shown in the management firmware 114 in the exemplary embodiment of FIG. 1 may be arranged in alternative linear or other forms of spatial arrangements within the memory 112. In the embodiment shown in FIG. 1, the emulated firmware instances 116, 118, 120, 122 are formed into a single flash image stored on the memory 112, which may be a flash memory device. Alternatively, one or more of the emulated instances may be stored on the memory 112 according to other memory storage types and/or techniques.

In one or more embodiments, the platform-specific data of an emulated firmware instance for a respective computing platform contains configuration data and/or control parameters for managing operation of one or more hardware components on the computing platform. As shown in FIG. 1, the first computing platform 150, second computing platform 160, third computing platform 170, and fourth computing platform 180 each have hardware components including a respective CPU 156, 166, 176, 186 and a respective memory device 158, 168, 178, 188. In one or more embodiments, the management functions performed by the management controller 110 include monitoring health-related aspects corresponding to operation of hardware components on the computing platforms 150, 160, 170, 180, such as the ambient temperature proximate each of the CPUs 156, 166, 176, 186, the rotational speed of a CPU fan or spindle motor, the voltage across or applied to one or more hardware components, and/or the available or used capacity of one or more memory devices, such as memory devices 158, 168, 178, 188. As shown in FIG. 1, the first computing platform 150 includes sensors 152, the second computing platform 160 includes sensors 162, the third computing platform 170 includes sensors 172, and the fourth computing platform 180 includes sensors 182. The management controller 110 is operative to perform the monitoring functions by causing respective sensors on each of the managed computing platforms 150, 160, 170, 180 to detect the one or more health-related aspects associated with the operation of corresponding hardware components.

Figure 4:
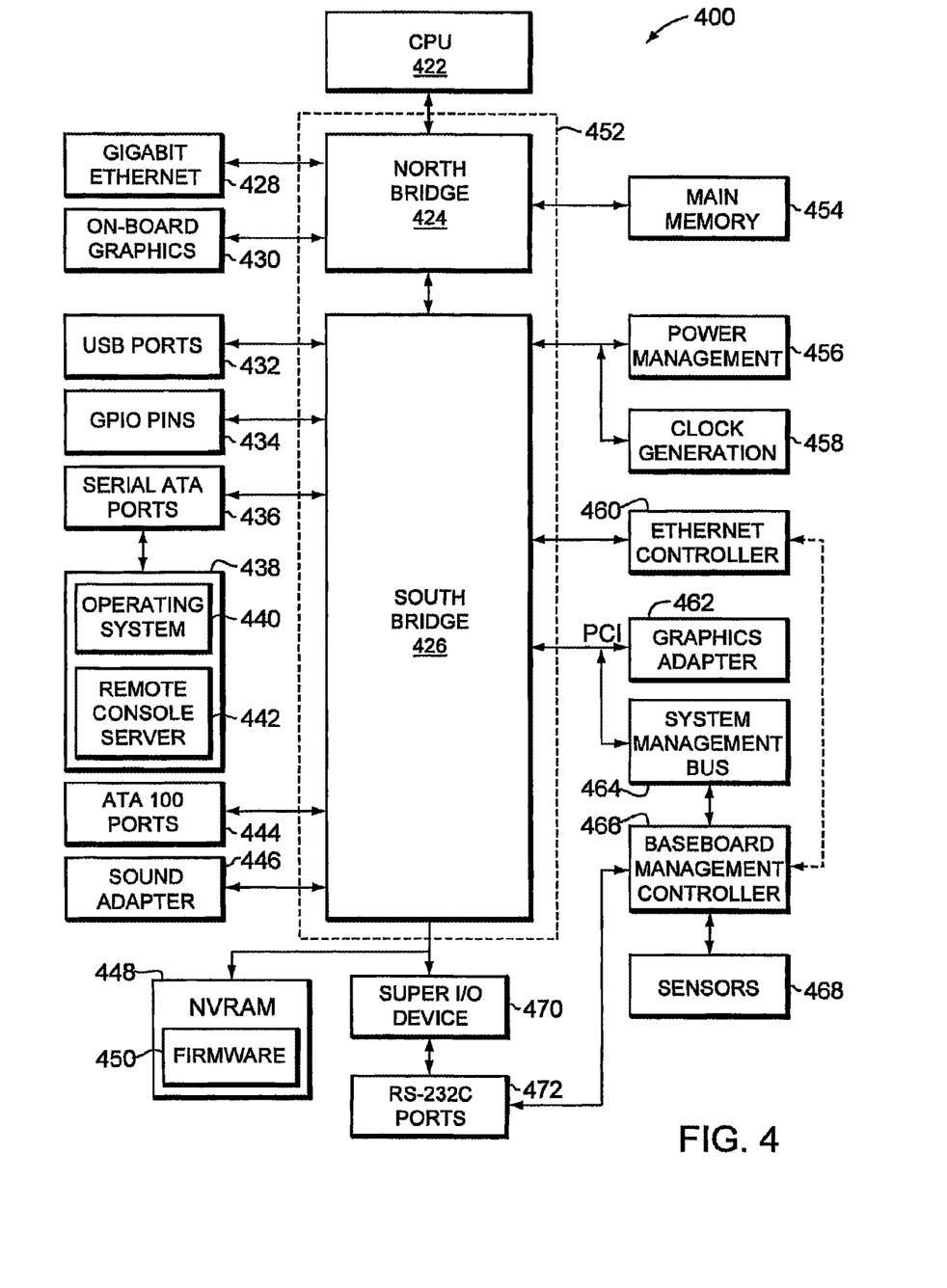
FIG. 4 schematically shows architecture of a computing device according to one or more embodiments of the present invention.

Now referring specifically to FIG. 4, a computer architecture is schematically shown for various computing systems utilized according to one or more embodiments of the present invention, such as one or more of the computing platforms 150, 160, 170, 180 shown in FIG. 1. It should be appreciated that although the embodiments described herein are discussed in the context of server computers, other types of computing devices such as personal desktop or laptop computers, workstations, and wireless handheld computers may be utilized. Further, those skilled in the art will recognize that the architecture shown in FIG. 4 may be utilized to embody a managed host computer or a remote management computer.

The architecture shown in FIG. 4 corresponds to a computer 400 having a baseboard, or "motherboard", which is a printed circuit board to which components or devices may be connected by way of a system bus or other electric communication path. In one embodiment, a central processing unit ("CPU") 422 operates in conjunction with a chipset 452. The CPU 422 is a standard central processor that performs arithmetic and logical operations necessary for the operation of the computer. The chipset 452 includes a north bridge 424 and a south bridge 426, where the north bridge 424 provides an interface between the CPU 422 and the remainder of the computer 400. The north bridge 424 also provides an interface to a random access memory ("RAM") used as the main memory 454 in the computer 400 and, optionally, to an onboard graphics adapter 440. The north bridge 424 may also include functionality for providing networking functions through a gigabit Ethernet adapter 428. The gigabit Ethernet adapter 428 is operative to connect the computer 400 to another computer via a network. Connections which may be made by the network adapter 428 include LAN or WAN connections. As shown, the north bridge 424 is connected to the south bridge 426.

The south bridge 426 is operative to control many of the input/output functions of the computer 400. In particular, the south bridge 426 may provide one or more universal serial bus ("USB") ports 442, an Ethernet controller 460, and one or more general purpose input/output ("GPIO") pins 444. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment ("SATA") adapter for providing one or more serial ATA ports 446. The serial ATA ports 446 may be, in turn, connected to one or more mass storage devices storing an operating system 440 and application programs 442, such as the SATA disk drive 448. Those skilled in the art will recognize that an operating system 440 has a set of programs that control operations of a computer and allocation of resources. An application program is software that runs on top of the operating system software, or other runtime environment, and uses computer resources to perform application specific tasks desired by the user.

The mass storage devices connected to the south bridge 426, and their associated computer-readable media, provide non-volatile storage for the computer 400. Although the description of computer-readable media contained herein refers to a mass storage device such as a hard disk or CD-ROM drive, those skilled in the art will recognize that computer-readable media can be any available media that can be accessed by the computer 400. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400.

As described briefly above, the south bridge 426 may include a system management bus 464. The system management bus 464 may include a baseboard management controller ("BMC") 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

It should be appreciated that the computer 400 may include other types of computing devices known to those skilled in the art. It is also contemplated that the computer 400 may not include all of the components shown in FIG. 4 and/or may include other components that are not explicitly shown in FIG. 4.

Now referring to FIGS. 1-4, in one aspect, the present invention relates to a firmware 114 on a management controller 110 that is operatively connected to a plurality of managed computing platforms 150, 160, 170, 180. In one embodiment, the firmware 114 includes a plurality of emulated instances 116, 118, 120, 122 of platform management firmware. Each emulated firmware instance contains platform-specific configuration data (for example, see configuration data 116A shown in FIG. 3) for a corresponding one of the managed computing platforms 150, 160, 170, 180. The management controller 110 is operative to perform one or more platform management functions for each of the managed computing platforms 150, 160, 170, 180 based at least in part on the configuration data for a corresponding one of the emulated firmware instances 116, 118, 120, 122.

In one embodiment, the platform-specific configuration data includes one or more of IPMI configuration data, SDR repository data, system event log (SEL) data, FRU data, and porting logic data for the corresponding one of the managed computing platforms 150, 160, 170, 180.

In one embodiment, the platform-specific data includes control parameters for managing operation of one or more hardware components (for example, see components 154, 156, 158 on the first computing platform 150, components 164, 166, 168 on the second computing platform 160, components 174, 176, 178 on the third computing platform 170, and components 184, 186, 188 on the fourth computing platform 180 shown in FIG. 1) on the corresponding one of the managed computing platforms 150, 160, 170, 180.

In one embodiment, one or more of the emulated firmware instances 116, 118, 120, 122 is formed as a flash image stored on a memory device 112 of the management controller 110.

In one embodiment, the management controller 110 is operative to perform the one or more platform management functions for each of the managed computing platforms 150, 160, 170, 180 via a corresponding one of a plurality of communications interfaces 126, 132, 138, 144. Each communications interface is communicatively coupled to a corresponding one of the managed computing platforms 150, 160, 170, 180 over a corresponding one of a plurality of communications links 127, 133, 139, 145.

In one embodiment, the one or more platform management functions include monitoring the operation of one or more hardware components on each corresponding one of the managed computing platforms 150, 160, 170, 180. In this embodiment, the monitoring function includes causing one or more sensors (for example, see sensors 152 on the first computing platform 150, sensors 162 on the second computing platform 160, sensors 172 on the third computing platform 170, and sensors 182 on the fourth computing platform 180 shown in FIG. 1) on the corresponding one of the managed computing platforms 150, 160, 170, 180 to detect one or more of the temperature of one or more hardware components, the rotational speed of a spindle motor or CPU fan, the voltage across or applied to one or more hardware components, and the available or used capacity of one or more memory devices.

In another aspect, the present invention relates to a firmware 114 on a management controller 110 that is operatively connected to a plurality of managed computing platforms 150, 160, 170, 180. In one embodiment, the firmware 114 includes a plurality of emulated instances 116, 118, 120, 122 of platform management firmware. Each emulated firmware instance contains platform-specific configuration data (for example, see configuration data 116A shown in FIG. 3) for a corresponding one of the managed computing platforms 150, 160, 170, 180. Each emulated firmware instance further includes computer-executable instructions which, when executed by a processor 124 of the management controller 110, cause the management controller 110 to perform one or more platform management functions for each of the managed computing platforms 150, 160, 170, 180 based at least in part on the configuration data for a corresponding one of the emulated firmware instances 116, 118, 120, 122.

In one embodiment, the platform-specific configuration data includes one or more of IPMI configuration data, SDR repository data, system event log (SEL) data, FRU data, and porting logic data for each corresponding one of the managed computing platforms 150, 160, 170, 180.

In one embodiment, the platform-specific data includes control parameters for managing operation of one or more hardware components on each corresponding one of the managed computing platforms 150, 160, 170, 180.

In one embodiment, the plurality of emulated firmware instances 116, 118, 120, 122 is formed in a single flash image stored on a memory device 112 of the management controller 110.

In one embodiment, the one or more platform management functions for each of the managed computing platforms 150, 160, 170, 180 is performed via a corresponding one of a plurality of communications interfaces 126, 132, 138, 144. Each communications interface is communicatively coupled to a corresponding one of the managed computing platforms 150, 160, 170, 180 over a corresponding one of a plurality of communications links 127, 133, 139, 145.

In one embodiment, the one or more platform management functions include monitoring one or more health-related aspects of the operation of one or more hardware components on each corresponding one of the managed computing platforms 150, 160, 170, 180. In this embodiment, monitoring the one or more health-related aspects includes causing one or more sensors to detect one or more of the temperature of one or more hardware components, the rotational speed of a spindle motor or CPU fan, the voltage across or applied to one or more hardware components, and the available or used capacity of one or more memory devices.

In yet another aspect, the present invention relates to a management controller 110 for managing a plurality of computing platforms 150, 160, 170, 180. In one embodiment, the management controller 110 includes a plurality of communications interfaces 126, 132, 138, 144, that are each configured to communicatively connect to a corresponding one of the plurality of managed computing platforms 150, 160, 170, 180. The management controller 110 further includes a memory device 112 including a firmware 114 that contains a plurality of emulated instances 116, 118, 120, 122 of platform management firmware. Each emulated firmware instance contains platform-specific configuration data (for example, see configuration data 116A in FIG. 3) for a corresponding one of the managed computing platforms 150, 160, 170, 180. The management controller 110 also includes a processor 124 that is operatively coupled to the memory device 112 and to the plurality of communications interfaces 126, 132, 138, 144. The processor 124 is programmed to perform one or more platform management functions for each of the managed computing platforms 150, 160, 170, 180 via a corresponding one of the communications interfaces 126, 132, 138, 144, based at least in part on the platform-specific configuration data of a corresponding one of the emulated firmware instances 116, 118, 120, 122.

In one embodiment, the platform-specific configuration data includes one or more of IPMI configuration data, SDR repository data, system event log (SEL) data, FRU data, and porting logic data for the corresponding one of the managed computing platforms 150, 160, 170, 180.

In one embodiment, the platform-specific data includes control parameters for managing operation of one or more hardware components (for example, see components 154, 156, 158 on the first computing platform 150, components 164, 166, 168 on the second computing platform 160, components 174, 176, 178 on the third computing platform 170, and components 184, 186, 188 on the fourth computing platform 180 shown in FIG. 1) on the corresponding one of the managed computing platforms 150, 160, 170, 180.

In one embodiment, one or more of the emulated firmware instances 116, 118, 120, 122 are formed in a flash image on the memory device 112.

In one embodiment, each one of the plurality of communications interfaces 126, 132, 138, 144 is connected to a corresponding one of a plurality of communications links 127, 133, 139, 145 and configured to communicatively connect to a corresponding one of the plurality of managed computing platforms 150, 160, 170, 180 over the corresponding communications link. In this embodiment, one or more of the communications interfaces 126, 132, 138, 144 are configured for communication over SGPIO, I2C, SPI, USB, or SMBus.

In one embodiment, the communications interfaces 126, 132, 138, 144 and corresponding communications links 127, 133, 139, 145 are configured for one or more of LAN, SOL, KCS, and IPMB communications.

In one embodiment, the communications link for one or more of the plurality of communications interfaces 127, 133, 139, 145 includes an internet connection.

In one embodiment, the one or more platform management functions include causing one or more sensors (for example, see sensors 152 on the first computing platform 150, sensors 162 on the second computing platform 160, sensors 172 on the third computing platform 170, and sensors 182 on the fourth computing platform 180 in FIG. 1) on each of the plurality of managed computing platforms 150, 160, 170, 180 to detect or more health-related aspects of the operation of one or more hardware components on each corresponding one of the managed computing platforms 150, 160, 170, 180.

In one embodiment, the one or more health-related aspects include one or more of the rotational speed of a spindle motor or CPU fan, the voltage across or applied to one or more hardware components, and the available or used capacity of one or more memory devices.

In a further aspect, the present invention relates to a method for managing functions of a plurality of computing platforms. In one embodiment, the method comprises the steps of:

installing a firmware on a management controller operatively connected to a plurality of managed computing platforms, wherein the firmware comprises a plurality of emulated instances of platform management firmware, each emulated firmware instance containing platform-specific configuration for a corresponding one of the managed computing platforms; and performing at least one platform management function for each of the managed computing platforms based at least in part on the configuration data for a corresponding one of the emulated firmware instances.

In one embodiment, the plurality of emulated firmware instances is formed in a single flash image stored on a memory device of the management controller.

In one embodiment, the at least one platform management function for each of the managed computing platforms is performed via a corresponding one of a plurality of communications interfaces, each communications interface communicatively coupled to a corresponding one of the managed computing platforms over a corresponding one of a plurality of communications links.

In one embodiment, the step of performing at least one platform management function comprises a step of monitoring at least one health-related aspect of the operation of one or more hardware components on each corresponding one of the managed computing platforms, wherein the step of monitoring the at least one health-related aspect comprises a step of causing one or more sensors to detect at least one of the temperature of one or more hardware components, the rotational speed of a spindle motor or CPU fan, the voltage across or applied to one or more hardware components, and the available or used capacity of one or more memory devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

The invention claimed is:

1. A firmware on a management controller operatively connected to a plurality of managed computing platforms, the firmware comprising:

a plurality of emulated firmware instances of platform management firmware, wherein each of the emulated firmware instances corresponds to a respective one of the managed computing platforms and comprises platform-specific configuration data for the corresponding respective one of the managed computing platforms, wherein the platform-specific configuration data of each of the emulated firmware instances comprises IPMI configuration data, SDR repository data, system event log (SEL) data, FRU data, and porting logic data specific to the corresponding respective managed computing platform; and wherein each of the emulated firmware instances, when executed at a processor of the management controller, is configured to perform at least one platform management function upon the corresponding respective managed computing platform based at least in part on the platform-specific configuration data of the instance for the corresponding respective one of the managed computing platforms via a corresponding one of a plurality of communications interfaces.

2. The firmware of claim 1, wherein the platform-specific configuration data of each of the emulated firmware instances further comprises control parameters for managing operation of one or more hardware components on the corresponding respective one of the managed computing platforms.

3. The firmware of claim 1, wherein at least one of the emulated firmware instances is formed as a flash image stored on a memory device of the management controller.

4. The firmware of claim 1, wherein each of the communications interfaces is configured to communicatively connect to the corresponding one of the managed computing platforms over a corresponding one of a plurality of communications links.

5. The firmware of claim 1, wherein the at least one platform management function for each of the managed computing platforms comprises monitoring operation of one or more hardware components on the corresponding one of the managed computing platforms.

6. The firmware of claim 5, wherein the monitoring function comprises causing one or more sensors on the corresponding managed computing platform to detect at least one of temperature of the one or more hardware components, a rotational speed of a spindle motor or CPU fan, voltage across or applied to the one or more hardware components, and available or used capacity of one or more memory devices of the managed computing platform.

7. A firmware on a management controller operatively connected to a plurality of managed computing platforms, the firmware comprising:

a plurality of emulated firmware instances of platform management firmware, wherein each of the emulated firmware instances corresponds to a respective one of the managed computing platforms and comprises platform-specific configuration data for the corresponding respective one of the managed computing platforms; and computer-executable instructions, when executed by a processor of the management controller, causing the management controller to execute the emulated firmware instances, wherein each of the emulated firmware instances is configured to perform at least one platform management function upon the corresponding respective managed computing platform based at least in part on the platform-specific configuration data of the instance for the corresponding respective one of the managed computing platforms via a corresponding one of a plurality of communications interfaces;

wherein the platform-specific configuration data of each of the emulated firmware instances comprises IPMI configuration data, SDR repository data, system event log (SEL) data, FRU data, and porting logic data specific to the corresponding respective managed computing platform.

8. The firmware of claim 7, wherein the platform-specific configuration data of each of the emulated firmware instances further comprises control parameters for managing operation of one or more hardware components on each corresponding respective one of the managed computing platforms.

9. The firmware of claim 7, wherein the plurality of emulated firmware instances is formed in a single flash image stored on a memory device of the management controller.

10. The firmware of claim 7, wherein each of the communications interfaces is configured to communicatively connect to the corresponding one of the managed computing platforms over a corresponding one of a plurality of communications links.

11. The firmware of claim 7, wherein the at least one platform management function for each of the managed computing platforms comprises monitoring at least one health-related aspect of operation of one or more hardware components on the corresponding one of the managed computing platforms.

12. The firmware of claim 11, wherein monitoring the at least one health-related aspect comprises causing one or more sensors on the corresponding managed computing platform to detect at least one of temperature of the one or more hardware components, a rotational speed of a spindle motor or CPU fan, voltage across or applied to the one or more hardware components, and available or used capacity of one or more memory devices of the managed computing platform.

13. A management controller for managing a plurality of computing platforms, comprising:
   a processor;
   a memory device operatively coupled to the processor and storing a platform management firmware, the platform management firmware comprising a plurality of emulated firmware instances, wherein each of the emulated firmware instances corresponds to a respective one of the managed computing platforms and comprises platform-specific configuration data for the corresponding respective one of the managed computing platforms; and
   a plurality of communications interfaces operatively coupled to the processor, each communications interface configured to communicatively connect to a corresponding respective one of the managed computing platforms;
   wherein the platform-specific configuration data of each of the emulated firmware instances comprises IPMI configuration data, SDR repository data, system event log (SEL) data, FRU data, and porting logic data specific to the corresponding respective managed computing platform;
   wherein each of the emulated firmware instances, when executed at the processor, is configured to perform at least one platform management function upon the corresponding respective managed computing platform based at least in part on the platform-specific configuration data of the instance for the corresponding respective one of the managed computing platforms via a corresponding one of the communications interfaces.

14. The management controller of claim 13, wherein the platform-specific configuration data of each of the emulated firmware instances further comprises control parameters for managing operation of one or more hardware on the corresponding respective one of the managed computing platforms.

15. The management controller of claim 13, wherein at least one of the emulated firmware instances is formed in a flash image on the memory device.

16. The management controller of claim 13, wherein each of the plurality of communications interfaces is configured to communicatively connect to the corresponding one of the managed computing platforms over a corresponding one of a plurality of communications links.

17. The management controller of claim 16, wherein at least one of the communications interfaces is configured for communication over SGPIO, I2C, SPI, USB, or SMBus.

18. The management controller of claim 16, wherein the communications interfaces and the corresponding communications links are configured for LAN, SOL, KCS, and IPMB communications, respectively.

19. The management controller of claim 16, wherein the corresponding communications link for at least one of the plurality of communications interfaces comprises an internet connection.

20. The management controller of claim 13, wherein for each of the managed computing platforms, the at least one platform management function comprises causing at least one sensor on the managed computing platform to detect at least one health-related aspect of operation of one or more hardware components on the managed computing platform.

21. The management computer of claim 20, wherein the at least one health-related aspect comprises at least one of rotational speed of a spindle motor or CPU fan, a voltage across or applied to the one or more hardware components, and available or used capacity of one or more memory devices of the managed computing platform.

22. A method for managing functions of a plurality of computing platforms, comprising the steps of:
   installing a platform management firmware on a management controller operatively connected to a plurality of managed computing platforms, wherein the firmware comprises a plurality of emulated firmware instances, wherein each of the emulated firmware instances corresponds to a respective one of the managed computing platforms and comprises platform-specific configuration data for the corresponding respective one of the managed computing platforms;
   executing, at a processor, each of the emulated firmware instances respectively for the corresponding respective one of the managed computing platforms;
   performing, by each of the emulated firmware instances executed at the processor, at least one platform management function upon the corresponding respective managed computing platform based at least in part on the platform-specific configuration data of the instance for a corresponding respective one of the managed computing platforms via a corresponding one of a plurality of communications interfaces;
   wherein the platform-specific configuration data of each of the emulated firmware instances comprises IPMI configuration data, SDR repository data, system event log (SEL) data, FRU data, and porting logic data specific to the corresponding respective managed computing platform.

23. The method of claim 22, wherein the plurality of emulated firmware instances is formed in a single flash image stored on a memory device of the management controller.

24. The method of claim 22, wherein each of the communications interfaces is configured to communicatively connect to the corresponding one of the managed computing platforms over a corresponding one of a plurality of communications links.

25. The method of claim 22, wherein the step of performing the at least one platform management function for the corresponding respective one of the managed computing platforms comprises monitoring at least one health-related aspect of operation of one or more hardware components on the managed computing platform.

26. The method of claim 25, wherein the step of monitoring the at least one health-related aspect comprises causing one or more sensors to detect at least one of temperature of the one or more hardware components, rotational speed of a spindle motor or CPU fan, a voltage across or applied to the one or more hardware components, and available or used capacity of one or more memory devices of the managed computing platform.

\* \* \* \* \*